United States Patent
Xu et al.

(10) Patent No.: US 12,106,202 B2
(45) Date of Patent: Oct. 1, 2024

(54) MACHINE-LEARNING METHOD AND SYSTEM TO OPTIMIZE HEALTH-CARE RESOURCES USING DOCTOR-INTERPRETABLE ENTITY PROFILES

(71) Applicant: NEC Laboratories Europe GmbH, Heidelberg (DE)

(72) Inventors: Zhao Xu, Heidelberg (DE); Giuseppe Serra, Heidelberg (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 0 days.

(21) Appl. No.: 18/338,384

(22) Filed: Jun. 21, 2023

(65) Prior Publication Data
US 2023/0334286 A1 Oct. 19, 2023

Related U.S. Application Data

(63) Continuation of application No. 16/841,762, filed on Apr. 7, 2020, now Pat. No. 11,727,248.

(51) Int. Cl.
*G06N 3/04* (2023.01)
*G06N 3/08* (2023.01)
(52) U.S. Cl.
CPC .............. *G06N 3/04* (2013.01); *G06N 3/08* (2013.01)
(58) Field of Classification Search
CPC ............ G06N 3/04; G06N 3/08; G06N 3/084
See application file for complete search history.

(56) References Cited

U.S. PATENT DOCUMENTS

| | | |
|---|---|---|
| 10,176,802 B1 | 1/2019 | Ladhak et al. |
| 2012/0281911 A1 | 11/2012 | Fung |
| 2015/0381649 A1 | 12/2015 | Schultz et al. |
| 2017/0371856 A1 | 12/2017 | Can et al. |
| 2019/0034764 A1 | 1/2019 | Oh et al. |
| 2019/0036952 A1 | 1/2019 | Sim et al. |

(Continued)

FOREIGN PATENT DOCUMENTS

CN 107547718 A 1/2018

OTHER PUBLICATIONS

Surens inffotek, "Artificial Intelligence Services," https://surensinffotek.com/artificial-intelligence-services/, Aug. 4, 2019.

(Continued)

*Primary Examiner* — Yong J Choe
(74) *Attorney, Agent, or Firm* — Leydig, Voit & Mayer, Ltd.

(57) ABSTRACT

A machine-learning method to optimize resource allocation extracts human-interpretable (e.g., doctor-interpretable) entity profiles from a text-labeled data graph of a system having a plurality of entities. The data graph is associated with a smart hospital and includes nodes representing the entities and edges between the nodes representing links between the entities. The method includes: obtaining the data graph and extracting the human-interpretable entity profiles from a tensor that has been learned, using a neural network, to capture patterns among text associated with the edges between respective pairs of the nodes. The neural network layers of the neural network are constructed such that the edges are modeled as a function of the associated text and cluster representations of the respective pairs of the nodes.

20 Claims, 4 Drawing Sheets

(56) References Cited

U.S. PATENT DOCUMENTS

2019/0080383 A1 3/2019 Garcia Duran et al.
2019/0156196 A1 5/2019 Zoldi et al.
2021/0012191 A1 1/2021 Qiao et al.

OTHER PUBLICATIONS

Srebrenik, Brian, "Ego Network Analysis for the Detection of Fake News," towards data science, Medium, https://towardsdatascience.com/ego-network-analysis-for-the-detection-of-fake-news-da6b2dfc7c7e, Feb. 18, 2019.
Cloud Vision API; "Detect Labels," Google Cloud document, Jun. 13, 2019; Retrieved from internet: https://web.archive.org/web/20190714205919/https://cloud.google.com/vision/.
Hayat, Malik Khizar et al. "Towards Deep Learning Prospects: Insights for Social Media Analytics," IEEE, Apr. 3, 2019.
Van Der Walt, Estee and Jan Eloff, "Using Machine Learning to Detect Fake Identities: Bots vs Humans," IEEE, Mar. 9, 2018.

MACHINE-LEARNING METHOD AND SYSTEM TO OPTIMIZE HEALTH-CARE RESOURCES USING DOCTOR-INTERPRETABLE ENTITY PROFILES

CROSS-REFERENCE TO PRIOR APPLICATIONS

This application is a continuation of U.S. application Ser. No. 16/841,762 filed on Apr. 7, 2020, the entire contents of which is hereby incorporated by reference herein.

STATEMENT OF RESEARCH FUNDING

The project leading to this application has received funding from the European Union's Horizon 2020 research and innovation programme under the Marie Sklodowska-Curie grant agreement No 766186.

FIELD

The present invention relates to a method and system for extracting interpretable entity profiles for system management and operation.

BACKGROUND

In complicated systems (e.g., smart hospitals), there exist a variety of entities (e.g., patients, doctors, etc.). The system also includes rich information (e.g., clinical narratives of patients composed by doctors, medical images of patients, and metadata of patients and doctors). However, in the system, human and physical resources (e.g., treatment rooms equipped with different medical facilities, doctors with different expertise, etc.) are finite.

Nevertheless, the system operators are expected to gain a comprehensive understanding of all the entities such that they can better manage and operate the system for diverse application contexts (e.g., resource allocation). Only if the operators correctly extract the profiles of the entities and resources (e.g., patients, doctors, and treatment rooms) based on their status, behavior, and historical records, then the operators can optimally allocate the limited resources for the target entities (e.g., patients). In addition, the allocation should be explainable and understandable (e.g., why a patient v is sent to a doctor u and a treatment room r). The explainability of the result will grow trust in the system (e.g., patient trust) and improve transparency of system management.

Artificial intelligence (AI) is increasingly being successfully applied to solve complex systems. Within AI, using neural networks to learn graph data (so called, graph neural networks (GNN)) has been applied to a variety of fields with great success, and as such has been garnering considerable interest. Node embedding can play an important role in GNNs. Indeed, many GNN approaches formulate graph learning with node embedding, and the downstream tasks, such as link prediction, node classification and (sub-)graph classification, are modeled with vector representations of nodes. Nevertheless, while GNN with node embeddings has shown to be a powerful tool, it is hampered by poor human interpretability and explainability.

Indeed, in order for humans to gain trust in artificial intelligence in general, interpretability should be an objective of the AI system. Most available interpretable AI systems are designed for supervised learning cases, and aim to answer: why does a machine learning method make a prediction y given an input x? A common strategy is to measure impacts of input attributes on the prediction. However in an unsupervised learning context (e.g., node embedding), interpretability can be more complicated. The output results themselves (i.e. embedding vectors) are not understandable (e.g., a 100d or 200d vector makes little sense to a human). Interpretability in node embedding thus includes explaining: (1) what the learned vectors mean; and (2) why a machine learning method generates such an embedding vector for a node given a graph. Conventional GNN node embedding solutions to not offer such interpretability.

SUMMARY

An embodiment of the present invention provides a method that extracts human-interpretable entity profiles from a text-labeled data graph of a system having a plurality of entities. The data graph is associated with a smart hospital and includes nodes representing the entities and edges between the nodes representing links between the entities. The method includes: obtaining the data graph and extracting the human-interpretable entity profiles from a tensor that has been learned, using a neural network, to capture patterns among text associated with the edges between respective pairs of the nodes. The neural network layers of the neural network are constructed such that the edges are modeled as a function of the associated text and cluster representations of the respective pairs of the nodes.

Aspects of the present invention thereby provide doctors and hospitals with machine-learning tools to efficiently optimize resource allocation in a way that is explainable and human understandable.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
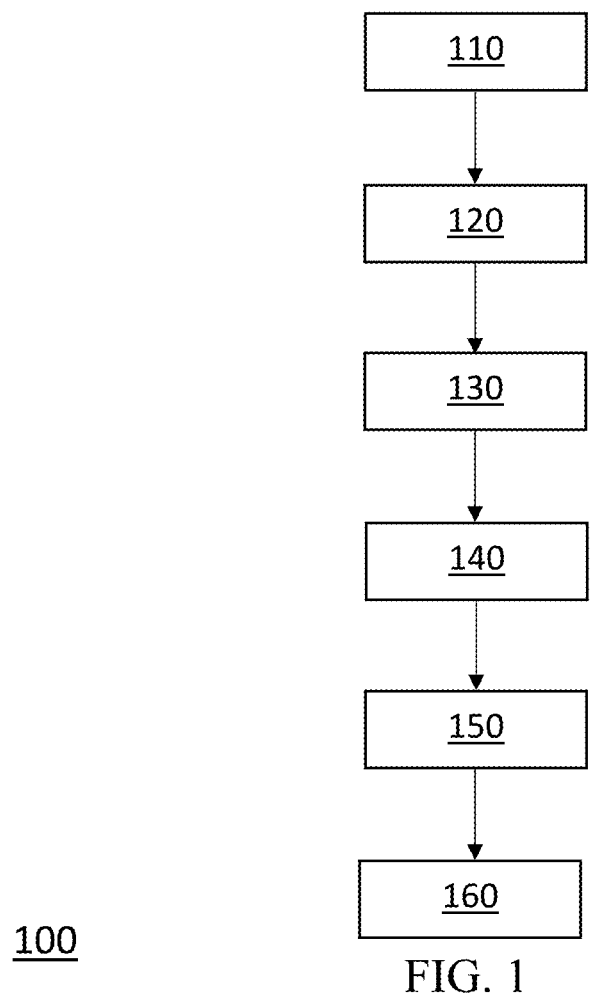
FIG. 1 illustrates an embodiment of a method according to the present invention.

Embodiments of the present invention provide a new way to operate complicated data to help system operators manage and operate their respective systems (e.g., resource allocation and anomaly detection). For example, a method is provided to automatically extract interpretable (e.g., human-understandable) representations (e.g., profiles) of entities involved in systems, from the data of the systems. The resulting interpretable representations of diverse entities enable system operators to easily identify and operate the target entities for different management tasks. Embodiments of the present invention can be used to enhance artificial intelligence (AI) systems with new functions (e.g., addressing a text-labeled graph and generating interpretable embedding for each entity), and can be deployed as a service at a cloud computing platform.

Typically, system operators conduct entity profiling by collecting all information of a particular entity, and then extracting a digital representation of that entity from the collected data. That is, existing entity profiling methods often extract profiles only from the entity's own data. However, the inventors have recognized that entities are generally not independent of each other. For example, information of similar entities can help profile an entity of interest (e.g., similar patients will help profile the patient of interest).

Thus, in embodiments of the present invention, data (e.g., all collected data or all possible or practically obtainable data) of entities are linked into a graph. In the graph, all relevant entities are vertices. The entities are linked via labeled edges (e.g., labeled with textual narratives about the relation of the entities or of one entity about another). In addition, meta-information (metadata) about the entities and the possible textual descriptions of some general properties of the entities may be available. The meta-information is directly linked to the corresponding entities in the graph.

By way of illustration, consider the use case of a smart hospital. All patients and doctors are vertices of the graph. The patients and the doctors are linked via edges labeled by clinical narratives composed by the doctors for the patients. Meta-information in the graph includes patient's demographics and textual descriptions of the patients, which are linked to the patients.

A neural network based method manipulates the text labeled graph, and extracts interpretable profiles for use by the system operator. The extraction of human-interpretable profiles provides an enhancement over the state of the art. This is because existing deep learning methods generally only learn real numbers as digital representations of unstructured data (e.g., images, texts, etc.). These learned numbers, unfortunately, are not understandable by humans (i.e., not human-interpretable).

To meet the technical challenges, embodiments of the present invention provide a new and improved way to operate the complicated system data encapsulated by the text labeled graph. The outputs of embodiments include: (1) computer-understandable real numbers; and (2) human-understandable, word-based profiles. With these outputs, system operators are enabled to better manage their system to allocate limited resources because, for example, the system operators have an interpretable way to operate the systems and to explain autonomous actions of the systems. In addition, the present invention captures probabilistic patterns of the data in a scalable way; and thus, is more resistant to data poisoning issues, which are of increasing importance in complicated systems.

According to an embodiment, a method extracts human-interpretable entity profiles from a text-labeled data graph of a system having a plurality of entities. The data graph includes nodes representing the entities and edges between the nodes representing links between the entities. A plurality of text is respectively associated with the corresponding edges. The method includes: constructing neural network layers configured such that each of the edges between a pair of the nodes is modeled as a function of the associated text and cluster representations of the pair of the nodes; for each one of the pair of nodes, performing machine learning to learn a tensor to capture patterns among the associated text and the pair of nodes, and extracting the entity profiles from the tensor.

The entities may include a plurality of entity classes.

In an embodiment, the constructing of the neural networks layers incudes: constructing cluster neural network layers to operate the data graph to learn cluster assignments for each of the entities, the cluster neural network layers taking as local parameters entity embedding vectors and cluster embedding vectors, the cluster embedding vectors corresponding to the cluster representations, and constructing word neural network layers to operate the data graph to learn correlations between word embedding vectors and the edges, the word neural network layers taking as local parameters the cluster embedding vectors and the word embedding vectors.

The method may further include performing machine learning to learn the entity embedding vectors and the cluster embedding vectors in parallel. Correlations are learned at cluster level and not the entity level.

The entities may be divided into at least a first entity class and a second entity class. Constructing the cluster neural network layers can include: constructing a first class of the cluster neural network layers for the first entity class to learn first cluster assignments of each of the entities of the first entity class. For each entity i of the first entity class, cluster weights $\theta_i$ are computed according to:

$$\theta_{i,k}=\text{normalization}(f(x_i,c_k;\phi)).$$

A cluster weight $\theta_{i,k}$ of the cluster weights $\theta_i$, specifies a probability of that the entity i is in a cluster k of a plurality of clusters, $f$ is a neural network function that quantifies a relevance or a similarity between a corresponding entity embedding vector $x_i$, of the entity embedding vectors, and a corresponding cluster embedding vector $c_k$, of the cluster embedding vectors, $\phi$ is a parameter of the neural network function $f$, normalization is a function for normalizing the output of the neural network function. Constructing the cluster neural network layers can further include constructing a second class of the cluster neural network layers for the second entity class to learn second cluster assignments of each of the entities of the second entity class. For each entity j of the second entity class, cluster weights $\theta_j$ are computed according to:

$$\theta_{j,l}=\text{normalization}(g(x_j,c_l;\xi))$$

A cluster weight $\theta_{j,l}$, of the cluster weights $\theta_j$, specifies a probability of that the entity j is in a cluster l of a plurality of clusters, g is a neural network function that quantifies a relevance or a similarity between a corresponding entity embedding vector $x_j$, of the entity embedding vectors, and a corresponding cluster embedding vector $c_l$, of the cluster embedding vectors, $\xi$ is a parameter of the neural network function g.

The entities can be divided into at least a first entity class and a second entity class. The nodes corresponding to the first entity class can be associated with first clusters. The nodes corresponding to the second entity class can be associated with second clusters. The neural network layers can be configured to learn first cluster embedding vectors as the cluster representations of the first clusters. The neural network layers can be configured to learn second cluster embedding vectors as the cluster representation of the first clusters. The neural network layers can be configured to learn first entity embedding vectors as representations of the entities of the first entity class. The neural network layers can be configured to learn second entity embedding vectors as representations of the entities of the second entity class. The tensor represents probabilistic patterns among the first clusters, the second clusters, and words of the text of the data graph, a slice of the tensor specifying a categorical word distribution for the associated text for the pair of nodes, the pair of nodes comprising a first node of a first cluster k of the first clusters and a second node of a second cluster l of the second clusters, the slice being computed according to:

$$\beta_{k,l,v} = \text{normalization}(\psi(c_k, c_l, x_v; \rho)).$$

Here, $\psi$ defines a neural network function with a parameter $\rho$, $x_v$ denotes a pre-trained word vector, $c_k$ is a first cluster embedding vector of the first cluster embedding vectors, $c_l$ is a second cluster embedding vector of the second cluster embedding vectors, normalization is a normalization function that operates on an output of the neural network function $\psi$.

The pre-trained word vector $x_v$ can be obtained by applying Word2Vec and GloVe on the text-labeled data graph.

The normalization function normalization can be Sparsemax or Softmax.

The method may further include minimizing a loss function, the loss function being:

$$-\sum_{n=1}^{N} \sum_{w=1}^{W} \log(\theta_u * \beta_{1:K,1:L,w} * \theta_v \cdot T) -$$
$$\sum_{m=1}^{M} \sum_{w'=1}^{W} \log \frac{1}{K}(\hat{1} * \beta_{1:K,1:L,w'} * \theta_{v'} \cdot T),$$

Here, n indexes a textual label between a first entity u, of the first entity class, and a second entity v, of the second entity class, N defines a totality of links with corresponding textual labels in the graph, m indexes a textual description of another entity v', of the second entity class, w is a word in the textual label between the first entity u and the second entity v, w' is a word in the textual description of the another entity v', $\theta_u$ is a cluster assignment of the first entity u, $\theta_v$ is a cluster assignment of the second entity v, T is a vector transpose function, $\hat{1}$ is a row vector with the value 1, and K is a number of clusters of the second entity class.

In an embodiment. the extracting the entity profiles from the tensor operation includes: extracting a word-based profile as the human-interpretable entity profile for each of the entities, and extracting a vector-based profile for each of the entities.

According to an embodiment, extracting the word-based profile includes determining a top H number of words in the learned tensor for an associated entity of the entities as the word-based profile for the entity.

The top H number of words may be determined according to:

$$\Sigma_{w=1}^{W} \log(\theta_u * \beta_{1:K,1:L,w} * \theta_v \cdot T)$$

Here, w is a word in the textual label of one of the edges, W is a total number of words in the textual label, $\beta_{1:K,1:L,w}$ is a slice of the tensor, $\theta_v$ is a cluster assignment of one of the entities, and T is a transpose function.

The method may further include: collecting data of the system, the data having at least one of textual narratives about the entities, metadata about the entities, or images about the entities; processing the data to prepare pre-processed data, the processing including at least one of text preprocessing, dictionary construction, word embedding, and image tagging; and generating the text-labeled data graph from the pre-processed data.

Another embodiment of the present invention provides a system having one or more processors which alone or in combination, are configured to provide for execution of a method for extracting human-interpretable entity profiles from a text-labeled data graph of a system comprised of entities. The data graph having nodes representing the entities and edges between the nodes representing links between the entities. A plurality of text is respectively associated with the corresponding edges. The method includes: constructing neural network layers configured such that each of the edges between a pair of the nodes is modeled as a function of the associated text and cluster representations of the pair of the nodes; for each one of the pair of nodes, performing machine learning to learn a tensor to capture patterns among the associated text and the pair of nodes; and extracting the entity profiles from the tensor.

Another embodiment of the present invention provides a tangible, non-transitory computer-readable medium having instructions thereon which, upon being executed by one or more processors, alone or in combination, provide for execution of a method for extracting human-interpretable entity profiles from a text-labeled data graph of a system made of entities. The data graph including nodes representing the entities and edges between the nodes representing links between the entities, a plurality of text being respectively associated with the corresponding edges. The method includes: constructing neural network layers configured such that each of the edges between a pair of the nodes is modeled as a function of the associated text and cluster representations of the pair of the nodes; for each one of the pair of nodes, performing machine learning to learn a tensor to capture patterns among the associated text and the pair of nodes; and extracting the entity profiles from the tensor.

To illustrate aspects of the present invention, consider a typical review network as an example. Here, assume that there are N number of users, and M number of products, which form a bipartite graph $\mathcal{G}$. Between a user i and a product j, there is an edge $r_{i,j}$. Without loss of generality, assume the edges are binary. Each edge is associated with a set of words $s_{i,j} = \{w_{i,j,1}, \ldots, w_{i,j,s}\}$. The size of the vocabulary is V.

An interpretable graph neural networks (iGNN), according to the present invention, is embedded in a neural generative modeling framework, which integrates good properties of probabilistic generative models and neural networks. The edges and the associated texts are sampled as follows.

For each user i, there is an embedding vector $x_i \in \mathcal{R}^D$ associated, which is sampled from a multivariate Gaussian with zero mean and a diagonal covariance matrix I:

$$x_i \sim \mathcal{N}_D(0, I)$$

For all users, K clusters are introduced, and each user cluster k is associated with an embedding vector $c_k \in \mathcal{R}^D$, which is drawn from a Gaussian:

$$c_k \sim \mathcal{N}_D(0, I)$$

Here, it is assumed that all embedding vectors have the same dimension to avoid complicated notation.

For a user i, her cluster weights $\theta_i$ is computed based on the embedding vectors:

$$\theta_{i,k} = \text{Sparsemax}(f(x_i, c_k; \phi))$$

which specifies the probability of the user i in the cluster k. The function $f$ quantifies the relevance or similarity between the user embedding vector $x_i$ and the cluster embedding vector $c_k$. The function is defined using a neural network with parameters $\phi$, e.g., a MLP (multilayer perception) with $x_i$ and $c_k$ as inputs and Sparsemax as an output layer.

Sparsemax is a normalization function, and is used to meet the standard constraints that probabilities are not negative and sum to one. Other normalization functions can also be used, e.g. softmax. The sparsemax is similar as softmax, but the resulting weights are more sparse, i.e. focusing on as few clusters as possible.

Equivalently, sample an embedding vector for each product j with: $x_j \sim \mathcal{N}_D(0,1)$. There are totally L product clusters. Embedding vector of each product cluster is again from Gaussian: $c_l \sim \mathcal{N}_D(0,1)$. The cluster mixture of a product is then computed similarly as: $\theta_{j,l}$=Sparsemax $(g(x_j,c_l;\xi))$. The function g is a neural network with parameters $\xi$.

An edger $r_{i,j}$ is then sampled as follows. Here we assume the edge is binary and follows a Bernoulli distribution with a distinct parameter $\lambda_{i,j}$, which is computed as: $\lambda_{i,j}$=h($x_i,x_j$, $\gamma$). The function h can be defined in a similar manner as f and g. Given the Bernoulli parameter $\lambda_{i,j}$, draw the edge: $r_{i,j} \sim$ Bernoulli($\lambda_{i,j}$).

A text associated with an edge $r_{i,j}$ is sampled. Each word $w_{i,j,v}$ in the text is drawn as follows:

$$z_{i,v} \sim \text{Categorical}(\theta_i)$$

$$z_{j,v} \sim \text{Categorical}(\theta_j)$$

$$w_{i,j,v} \sim \text{Categorical}(\beta_{,z_{i,v},z_{j,v}}) \quad \text{(EQ 1)}$$

Where $\beta$ is a 3d tensor representing the probabilistic patterns among user clusters, product clusters and words. In particular, $\beta_{k,l,1:V}$ specifies a categorical word distribution conditioned on the user cluster k and the product cluster l. It lies in a (V−1)-dimensional simplex $\Delta^{V-1}$, i.e., $\Sigma_{v=1}^V=1$ $\beta_{k,l,v}$ and $\beta_{k,l,v}>0$. V denotes the number of words. The parameter flux is computed as:

$$\beta_{k,l,v}=\text{Sparsemax}(\psi(c_k,c_l,x_v;\rho))$$

The function $\psi$ defines a neural network with parameters $\rho$. $x_v$ denotes the pre-trained word vector, e.g., from Word2Vec and GloVe. The word sampling is inspired by the topic models. Here we assume every relation and word follow their own distributions with distinct parameters computed with functions of the embedding vectors of the involved nodes.

Given the iGNN model, we can now generate a textual explanation of a node embedding. For a node, e.g. a user i, the textual explanation is formulated as a node-specific word distribution $p(w_v|x_i)$ conditioned on its embedding vector $x_i$. In particular, the probability of a word v to be used to explain the embedding $x_i$ is computed as:

$$\frac{1}{L}\sum_{k,l} \text{Sparse max}(f(x_i, c_k)) \text{Sparse max}(\psi(c_k, c_l, x_v)) \quad \text{(EQ 2)}$$

This is a marginal distribution over all possible user and product clusters. Since the target distribution is not related to any specific products, the product clusters are equally distributed, i.e. the term $$\frac{1}{L}$$

in Eq. (2). Textual explanations for product nodes can be generated in an equivalent manner.

Based on the textual explanations, we can measure the similarity/matching between two nodes in an understandable way. In particular, given a set of explanation words $\{x_v\}$ of a user i, and a set of explanation words $\{x_{v'}\}$ of a product j, the similarity between the user and the product is:

$$\underset{v,v'}{\text{mean}}\ x_v x_{v'}.T/(\|x_v\| * \|x_{v'}\|)$$

Next, the system learns the maximum likelihood estimation of the unknown parameters. In the iGNN model, the parameters to be learned include embedding vectors of nodes $\{x_i\}_{i=1}^N$ and $\{x_j\}_{j=1}^M$, embedding vectors of clusters $\{c_k\}_{k=1}^K$ and $\{c_l\}_{l=1}^L$, and parameters $\phi$, $\xi$, $\gamma$ and $\rho$ that define the neural networks f, g, h and $\psi$.

The log likelihood of an edge and the corresponding text is:

$$\log p(r_{i,j}|x_i, x_j, \gamma) + \sum_v^S \log(\sum_k^K \sum_l^L p(z_i = k|x_i, c_k, \phi) \quad \text{(EQ 3)}$$

$$p(z_j = l|x_j, c_l, \xi) p(w_{i,j,v}|c_k, c_l, x_v, \rho))$$

Given the log likelihood, backpropagation can be used to efficiently optimize the model.

In general terms, a method according to the invention is provided to generate human-interpretable word-based and number-based profiles for entities in a system. A system operator may then utilize these extracted profiles to operate the system (e.g., to allocate resources optimally or to find target entities for different application contexts. The method can be conceptualized as six steps: (1) collect data; (2) preprocess the data; (3); generate a graph from the data; (4) construct neural network layers to operate the data graph; (5) optimize the system until convergence; and (6) extract human-interpretable profiles. This method is described in more detail below.

In Step 1, the data is collected. This data can include narratives, metadata, and images about the entities of the systems.

In Step 2, the data is preprocessed. Preprocessing the data may include text preprocessing (e.g., tokenization, or removal of special characters and punctuations). A dictionary (or vocabulary) may also be constructed (e.g., via TFIDF (term frequency-inverse document frequency) filtering) and word embeddings may be generated. This preprocessing step may also include image tagging that coverts images to texts/keywords.

In Step 3, the graph is generated. From the preprocessed data, a text labeled graph (e.g., represented with triples or property graph) is generated in order to integrate all relevant information of the entities in the system. In the graph, each node is an entity of the system (which may be of a plurality of different categories of entities). Also, each edge represents a link between each entity, and is associated with a short paragraph of texts (e.g., texts explaining the link). Meta-information is connected to the corresponding node directly.

In Step 4, the neural network layers are constructed as described above to operate the graph data. Neural networks are constructed to learn the cluster assignments for each of the entities (according to entity type). These neural networks take as local parameters the embedding vectors for the entities. The output of these neural networks can be normalized as part of learning the cluster assignments. Another branch of neural network is constructed to learn the correlations between word embeddings and entity cluster embeddings, which are linked by the text labeled edges between entities. This neural network takes as its global parameters the embedding vectors for the clusters. The output of this neural network can also be normalized. Overall this step creates embedding's. In particular, vector embedding's are learned, according to entity type, for each entity and for the clusters of entities.

Accordingly, each text-labeled edge between a pair of entities is modeled as a function of the text and the cluster representations of the two entities. A three-dimensional tensor is learned to capture and keep the patterns among these three parts (i.e., edge associated with words, entity 1, and entity 2). The two entities can be heterogeneous, i.e. belong to different entity classes. For example, a hospital system may include two entity classes: Patient and Doctor. The Patient Class includes patient entities, e.g., Alice, Bob, and Christina. The Doctor Class includes doctor entities, e.g., Daniela and Eric. As another example, an online shop system may include two entity classes: User and Product. The User Class includes user entities, e.g., Frank, Gina, and Henry. The Product class includes product entities, e.g., milk, apple, cherry, and tomato.

The method is scalable because the latent representations of the entities and their clusters are learned simultaneously (or contemporaneously) and because the correlations can be learned at the cluster levels, instead of the entity levels.

In Step 5, the method iteratively optimizes the parameters of the neural networks until convergence. The parameters include the global and local parameters, which can be optimized by minimizing a loss function (e.g., via stochastic gradient decent).

In Step 6, the method extracts two-fold profiles of the entities. That is, the method generates word-based and number-based profiles for each of entities. The number based profile is the vector-based profile comprising the learned local parameters of the neural network (e.g., the learned entity embeddings, i.e. the embedding layer). The word-based profile is obtained by operating the system parameters, e.g., scoring words associated with each entity and selecting the top words as part of the word-based profile. Based on the extracted profiles, the system can allocate resource optimally, or find target entities for different application contexts.

The present invention will now be described in greater detail with respect to exemplary embodiments and with the aid of the figures.

FIG. 1 illustrates an embodiment of a method according to an exemplary embodiment of the invention. The method is described as operating within a smart hospital system having two categories of entities, i.e., patients and doctors. However, it should be recognized that the present invention is not limited to this particular system construction.

The method 100 includes six base operations. While these operations are discussed in sequence, a person of ordinary skill in the art would recognize that in some implementations one or more of the operations may be done in parallel or out of order.

In operation 110, system data is collected. The data includes: clinical narratives composed by doctors about patients, metadata of patients and doctors (e.g. patient age, gender, weight, etc.), as well as medical images of patients.

In operation 120, the collected system data is preprocessed. The data preprocessing operation 120 includes: a text preprocessing pipeline (e.g., tokenization and removal of special characters and punctuations), dictionary construction via TFIDF filtering, word embedding, and image tagging (e.g., converting images to texts/keywords).

In operation 130, a data graph is generated from the preprocessed data. The data graph generation operation 130 may generate a text labeled graph (e.g., a represented with triples) or a property graph. The graph integrates all of the information contained in the preprocessed data. Each node is an entity, i.e., a doctor or a patient. Each edge is a link between a patient and a doctor, each edge is also associated with a short paragraph of text. The meta-information is connected to the corresponding node directly.

Figure 2:
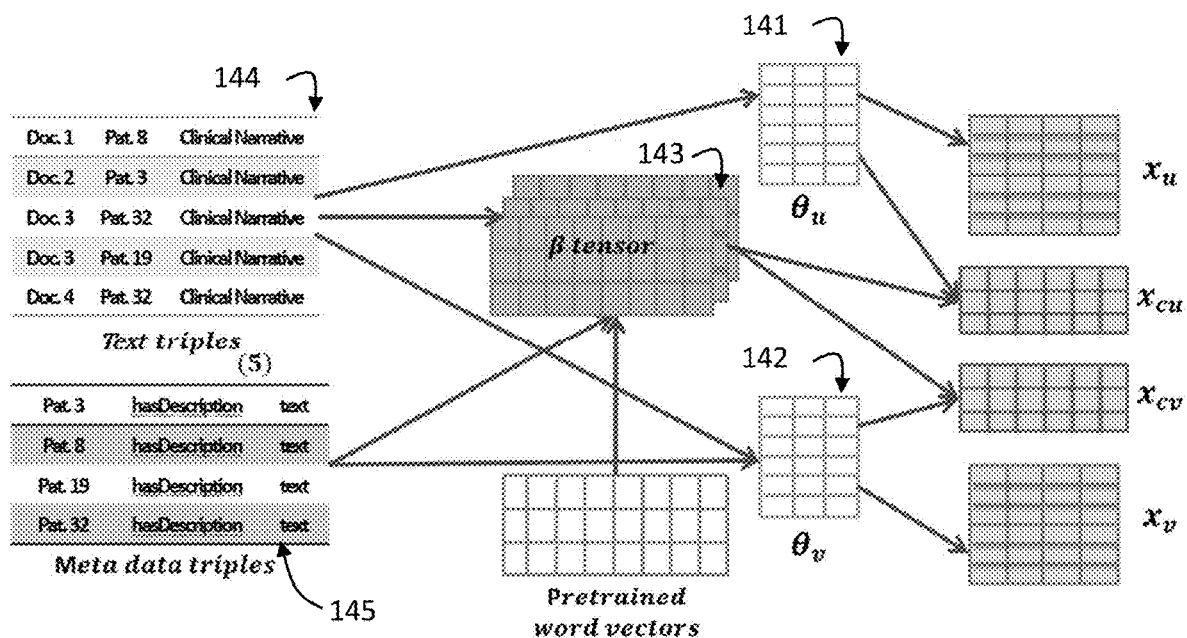
FIG. 2 illustrates an embodiment of neural network layer construction operation of the method of FIG. 1.

In operation 140, neural network layers are constructed to operate the data graph. FIG. 2 illustrates further details on an embodiment of the neural network construction operation 140. FIG. 2 visualizes details of the cluster assignment equations 141, 142; the β tensor equation 143; the text relation triplets 144; and the metadata relation triplets 145.

The local parameters of the method include: $x_u$ one row vector for each doctor; and $x_v$ one row vector for each patient. The global parameters of the method include: $x_{cu}$ one row vector for each doctor cluster; $x_{cv}$ one row vector for each patient cluster, and the parameters in the following equations:

$$\theta_u = \text{softmax}(x_u * W_0 * x_{cu} \cdot T) \tag{141}$$

$$\theta_v = \text{softmax}(x_u * W_1 * x_{cv} \cdot T) \tag{142}$$

$$\beta_{k,l,w} = \text{softmax}(x_w * W_2 * [x_{cu}, x_{cv}] \cdot T) \tag{143}$$

Here, $\theta_u$ and $\theta_v$ are cluster assignments of a doctor u and a patient v, respectively. $\beta_{k,l,w}$ denotes the correlations with respect to words. $x_w$ is a word embedding obtained during data preprocessing. The operation T denotes a vector/matrix transpose. In the equations 141-143, we give examples of how to define the functions f, g, and $\psi$.

The method assumes that a text labeled link relation(u,v, text) between an doctor u and patient v in the text labeled graph follows a probabilistic distribution. The log likelihood can be obtained with:

$$\log P(\text{relation}(u,v,\text{text})|\theta_u,\theta_v,\beta) = \Sigma_{w=1}^{W} \log(\theta_u * \beta_{1:K,1:L,w} * \theta_v \cdot T) \tag{144}$$

Here, w is a word in the textual label of the relation. $\beta_{1:K,1:L,w}$ is a slice of the tensor. The method also assumes probabilistic distributions for meta-information of entities. For example, a triple (v, hasDescription, text) about a description of a patient v can have log likelihood computed as:

$$\log P(\text{triple}(v, \text{has Description, text})|\theta_v, \beta) = \\ \sum_{w=1}^{W} \log \frac{1}{K} (\hat{1} * \beta_{1:K,1:L,w} * \theta_v \cdot T) \tag{145}$$

Here, $\hat{1}$ denotes a row vector with the value 1 for all entries. K is the number of patient clusters.

Referring back to FIG. 1, the method includes operation 105 where the local and global parameters of the method are iteratively optimized until convergence. The local parameters are vectors of entities. The global parameters are those of neural network layers.

The optimizing operation 105 may iteratively minimize a loss function with respect to the global and local parameters of the method (e.g., via stochastic gradient descent method). An exemplary loss function is given below:

$$-\sum_{n=1}^{N}\sum_{w=1}^{W}\log(\theta_u * \beta_{1:K,1:L,w} * \theta_v \cdot T) - \sum_{m=1}^{M}\sum_{w'=1}^{W}\log\frac{1}{K}(\hat{1} * \beta_{1:K,1:L,w'} * \theta_v \cdot T)$$

Here, n indexes the textual label between a doctor u and a patient v. There are at total of N links with the corresponding textual labels in the graph. m is the index of a description of a patient v'. A word in the description is denoted as w'. There are M descriptions in the graph. The other meta-information can be operated in a similar way.

In operation 106, two-fold profiles are extracted for the doctors and/or patients. The extraction operation 106 generates word-based profiles and number-based profiles for each of the entities. The number-based (i.e., vector-based) profiles are the local parameters of the method (e.g., $x_u$ for the doctor u). The word-based profiles are obtained by operating the system parameters. For example, the top H words can be selected for each doctor u as its word-based profile, where the score of a word w is: $\theta_u * \beta_{1:K,1:L,w} * \hat{1} \cdot T$.

To further elucidate aspects of the present invention, two potential implementations are discussed below: resource allocation for a smart hospital; and management of social media systems for anomalous user detection.

Resource allocation is of considerable concern in hospitals, however, optimizing resource allocation is often too complex to execute without the appropriate tools. Moreover, as discussed above, effective resource allocation should also be explainable and human understandable. Embodiments of the present invention can therefore provide an improved resource allocation for smart hospitals that is explainable and human understandable.

When a patient comes to a hospital, an effective smart hospital system should automatically allocate a doctor and a diagnosis/treatment room for the patient. The rooms and the doctors, however, are limited resource. Therefore, optimizing resource allocation such that all patients are assigned to suitable doctors and rooms is an important technical problem for a smart hospital system. Embodiments of the present invention solve this technical problem in a way that is easily understandable.

Using an electronic health record (EHR) system, a text labeled graph is constructed for a set of doctors. The nodes of the data graph include doctors, (historical) patients, and diagnosis/treatment rooms. The text-labeled edges are clinical narratives from doctors to patients. The diagnosis/treatment rooms are associated with (textual) attributes and other meta-information, and are linked to the (historical) patients.

Word-based profiles of the doctors and the rooms are also learned from the collected data (e.g., using Word2Vec and/or GloVe).

For a set of newly arrived patients, the smart hospital obtains the patients' initial information, such as: symptoms (represented as words), initial assumptions about possible diseases (represented as words or ICD codes), possible medical images, etc. The system can convert images to texts with available image tagging tools.

A similarity table is computed, determining similarities between patients and doctors/rooms. In particular, given a set of description words $\{w_{v,i}\}$ of a patient v, and a set of profile words $\{w_{d,j}\}$ of a doctor d, the similarity between the doctor and the patent is:

$$\operatorname*{mean}_{i,j} w_{v,i} \times w_{d,j} \cdot T/(\|w_{v,i}\| \times \|w_{d,j}\|).$$

The similarity score between the patient and a room is calculated in an equivalent way.

The sum of similarity coefficients is then obtained for each doctor and room. The doctor and room with more constraints is selected (e.g., more constraints indicating a better availability). In general, the system selects the doctor $d_*$ with the smallest coefficient sum, then selects the patient $v_*$, who has the largest similarity with the doctor Similarly, the system selects the room $r_*$ and the corresponding patient $u_*$.

The system then informs the patients $u_*$ and $v_*$, as well as the doctor $d_*$ and the room $r_*$ with the corresponding information. The system then remove the patient $v_*$ from the table of doctors, and removes the patient $u_*$ from the table of rooms.

Subsequent patients can be assigned to doctors and rooms in a similar manner.

A system operator or user (such as the doctor or patient) can see words associated with their assignment in order to understand the basis of the allocation.

Embodiments of the present invention can also be deployed to provide an interpretable entity profiling method for other application contexts, for example to identify anomalous users of a social network system.

Figure 3:
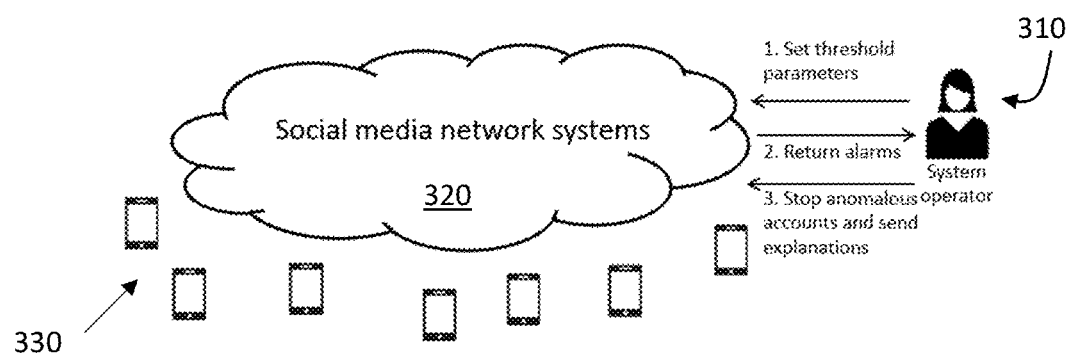
FIG. 3 illustrates an embodiment of a system according to the present invention.

Due to the vast use of social media networks, management of the network systems becomes more and more critical, and attracts increasing attention. The presented invention can be used for the task of explainable anomaly detection. FIG. 3 illustrates an explainable anomaly detection system for social media systems.

The system operators 310 set parameters for the social media network systems 320. These parameters may include the time window length Q, and the threshold number N denoting how many anomalous accounts they will block or track.

For each time window of length Q, the system 300 will generate the word-based profile for each user account associated with users 330. The word-based profile is denoted as $\{w_p\}^{(t)}$.

The system 300 will then compute the change of the profiles between two consecutive time windows t and (t−1):

$$\min_{p',p} w_{p'}^{(t-1)} * w_p^{(t)} \cdot T / (\|w_{p'}^{(t-1)}\| * \|w_p^{(t)}\|)$$

Here, the symbol $\|\cdot\|$ denotes l2 norm of the word vector.

The system 300 can generate an alarm and stop the top N accounts with the largest minimal changes.

The system 300 can log the extracted human-understandable profiles of the anomalous accounts at the time windows t and t-1as the explanation of the operations.

An embodiment of the present invention has been analyzed to determine the performance of the described iGNN method. In the quantitative analysis, the learned representations are used to predict the preference of users with respect to products.

The embodiments was evaluated using Amazon Product Data, which includes millions of product reviews and metadata collected from May 1999 to July 2014. A summary of the data sets is shown in Table 1. The Amazon Product data is available at the url: jmcauley.ucsd.edu/data/amazon.

TABLE 1

Statistics of the original data sets.

| CATEGORY | REVIEWS | USERS | PRODUCTS |
|---|---|---|---|
| INSTANT VIDEOS | 37126 | 5131 | 1686 |
| AUTOMOTIVE | 20473 | 2929 | 1836 |
| BABY | 160792 | 19445 | 7050 |
| CDS AND VINYLS | 1097592 | 75259 | 64444 |
| GOURMET FOOD | 151254 | 14682 | 8714 |
| HEALTH | 346355 | 38610 | 18535 |
| KINDLE STORE | 982619 | 68224 | 61935 |
| MUSICAL INSTR. | 10261 | 1430 | 901 |
| OFFICE PRODUCTS | 53258 | 4906 | 2421 |
| PATIO | 13272 | 1687 | 963 |
| PET SUPPLIES | 157836 | 19857 | 8511 |
| TOOLS HOME | 134476 | 16639 | 10218 |
| TOYS GAMES | 167597 | 19413 | 11925 |
| BEAUTY | 198502 | 22364 | 12102 |
| DIGITAL MUSIC | 64706 | 5542 | 3569 |
| VIDEO GAMES | 231780 | 24302 | 10673 |
| SPORTS OUTDOORS | 296337 | 35599 | 18358 |
| CELL PHONES | 194439 | 27880 | 10430 | vector representations of users and products. The vector representations are used to predict ratings.

Non-negative Matrix Factorization (NMF) and Singular Value Decomposition (SVD): which are matrix factorization techniques, which estimate ratings based on user ratings only.

Hidden Factors as Topics (HFT): which combines latent dimensions in rating data with topics in review text.

Deep Cooperative Neural Networks (DeepCoNN), which is a deep model where a shared layer is introduced to enable latent factors learned for users and items to interact with each other.

TransRev: which approximates the embedding review at test time as the difference of the item and user embedding. The approximated review embedding is then used to predict the rating along with a regression model.

To measure the performance of the methods, Mean Squared Error (MSE) was used. The results are shown as Table 2, with the best performing results indicated in bold. One can see that the present embodiment achieves better or comparable results to the state-of-the-art, which demonstrates the effectiveness and technical improvements provided by the present invention.

TABLE 2

Performance of the iGNN and the baselines, measured with MSE

| CATEGORY | OFFSET | ATTN + CNN | NMF | SVD | HFT | DEEPCONN | TRANSREV | IGNN |
|---|---|---|---|---|---|---|---|---|
| AMAZON INSTANT VIDEOS | 1.180 | 0.936 | 0.946 | 0.904 | 0.888 | 0.943 | 0.884 | 0.913 |
| AUTOMOTIVE | 0.948 | 0.881 | 0.876 | 0.857 | 0.862 | 0.753 | 0.855 | 0.812 |
| BABY | 1.262 | 1.176 | 1.171 | 1.108 | 1.104 | 1.154 | 1.100 | 1.088 |
| CDS AND VINYLS | 1.127 | 0.886 | 0.871 | 0.863 | 0.854 | 0.888 | 0.854 | 0.801 |
| GROCERY, GOURMET FOOD | 1.165 | 1.004 | 0.985 | 0.964 | 0.961 | 0.973 | 0.957 | 0.940 |
| HEALTH, PERSONAL CARE | 1.200 | 1.054 | 1.048 | 1.016 | 1.014 | 1.081 | 1.011 | 1.010 |
| KINDLE STORE | 0.870 | 0.617 | 0.624 | 0.607 | 0.593 | 0.648 | 0.599 | 0.587 |
| MUSICAL INSTRUMENTS | 0.733 | 0.703 | 0.725 | 0.694 | 0.692 | 0.723 | 0.690 | 0.717 |
| OFFICE PRODUCTS | 0.876 | 0.726 | 0.742 | 0.727 | 0.727 | 0.738 | 0.724 | 0.665 |
| PATIO, LAWN AND GARDEN | 1.156 | 0.999 | 0.958 | 0.950 | 0.956 | 1.070 | 0.941 | 0.955 |
| PET SUPPLIES | 1.354 | 1.236 | 1.241 | 1.198 | 1.194 | 1.281 | 1.191 | 1.170 |
| TOOLS AND HOME IMPROV. | 1.017 | 0.938 | 0.908 | 0.884 | 0.884 | 0.946 | 0.879 | 0.915 |
| TOYS AND GAMES | 0.975 | — | 0.821 | 0.788 | 0.784 | 0.851 | 0.784 | 0.788 |
| BEAUTY | 1.322 | — | 1.204 | 1.168 | 1.165 | 1.184 | 1.158 | 1.093 |
| DIGITAL MUSIC | 1.137 | — | 0.805 | 0.797 | 0.793 | 0.835 | 0.782 | 0.750 |
| VIDEO GAMES | 1.401 | — | 1.138 | 1.093 | 1.086 | 1.133 | 1.082 | 0.992 |
| SPORTS AND OUTDOORS | 0.931 | — | 0.856 | 0.828 | 0.824 | 0.882 | 0.823 | 0.855 |
| CELL PHONES AND ACC. | 1.451 | — | 1.357 | 1.290 | 1.285 | 1.365 | 1.279 | 1.132 |

For data preprocessing, the popular 5-core setting, where each user and product has at least 5 reviews, was used. Additionally, the users who assign the same ratings to all products were removed in preprocessing.

Because ratings are determined not only by user interests but also by the rating habits of users, the ratings are preprocessed with a shift of the average ratings, i.e. $\hat{R}_{ij} = R_{ij} - \bar{R}_i$. Also, for each review, stopwords, numbers and special characters are removed.

A bag-of-words assumption is also used, and the top 10% words are selected based on the tf-idf. The word vectors are pre-trained with Word2Vec. The data sets are randomly split into training (80%), validation (10%) and test (10%).

The embodiment of the present invention was compared against some state-of-the-art methods. Including the following:

Offset: which uses the average rating of the dataset as its prediction.

Figure 4:
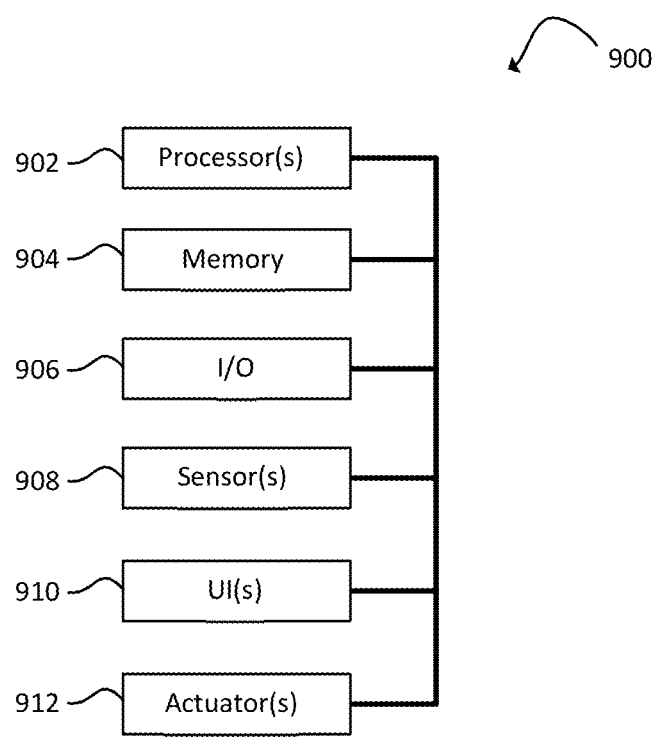
FIG. 4 is a block diagram of an exemplary processing system, which can be configured to perform any and all operations disclosed herein.

Attention-based CNN (Attn+CNN): which combines a CNN (convolutional neural network) with attention to build Referring to FIG. 4, a processing system 900 can include one or more processors 902, memory 904, one or more input/output devices 906, one or more sensors 908, one or more user interfaces 910, and one or more actuators 912. Processing system 900 can be representative of each computing system disclosed herein.

Processors 902 can include one or more distinct processors, each having one or more cores. Each of the distinct processors can have the same or different structure. Processors 902 can include one or more central processing units (CPUs), one or more graphics processing units (GPUs), circuitry (e.g., application specific integrated circuits (ASICs)), digital signal processors (DSPs), and the like. Processors 902 can be mounted to a common substrate or to multiple different substrates.

Processors 902 are configured to perform a certain function, method, or operation (e.g., are configured to provide for performance of a function, method, or operation) at least when one of the one or more of the distinct processors is capable of performing operations embodying the function, method, or operation. Processors 902 can perform operations embodying the function, method, or operation by, for example, executing code (e.g., interpreting scripts) stored on memory 904 and/or trafficking data through one or more ASICs. Processors 902, and thus processing system 900, can be configured to perform, automatically, any and all functions, methods, and operations disclosed herein. Therefore, processing system 900 can be configured to implement any of (e.g., all of) the protocols, devices, mechanisms, systems, and methods described herein.

For example, when the present disclosure states that a method or device performs operation "X" (or that operation "X" is performed), such a statement should be understood to disclose that processing system 900 can be configured to perform operation "X". Processing system 900 is configured to perform a function, method, or operation at least when processors 902 are configured to do the same.

Memory 904 can include volatile memory, non-volatile memory, and any other medium capable of storing data. Each of the volatile memory, non-volatile memory, and any other type of memory can include multiple different memory devices, located at multiple distinct locations and each having a different structure. Memory 904 can include remotely hosted (e.g., cloud) storage.

Examples of memory 904 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 904.

Input-output devices 906 can include any component for trafficking data such as ports, antennas (i.e., transceivers), printed conductive paths, and the like. Input-output devices 906 can enable wired communication via USB®, DisplayPort®, HDMI®, Ethernet, and the like. Input-output devices 906 can enable electronic, optical, magnetic, and holographic, communication with suitable memory 906. Input-output devices 906 can enable wireless communication via WiFi®, Bluetooth®, cellular (e.g., LTE®, CDMA®, GSM®, WiMax®, NFC®), GPS, and the like. Input-output devices 906 can include wired and/or wireless communication pathways.

Sensors 908 can capture physical measurements of environment and report the same to processors 902. User interface 910 can include displays, physical buttons, speakers, microphones, keyboards, and the like. Actuators 912 can enable processors 902 to control mechanical forces.

Processing system 900 can be distributed. For example, some components of processing system 900 can reside in a remote hosted network service (e.g., a cloud computing environment) while other components of processing system 900 can reside in a local computing system. Processing system 900 can have a modular design where certain modules include a plurality of the features/functions shown in FIG. 9. For example, I/O modules can include volatile memory and one or more processors. As another example, individual processor modules can include read-only-memory and/or local caches.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for extracting human-interpretable entity profiles from a text-labeled data graph of a system comprised of entities, the method comprising:
   obtaining a data graph associated with a smart hospital, the data graph comprising nodes representing the entities and edges between the nodes representing links between the entities, and
   extracting the human-interpretable entity profiles from a tensor that has been learned, using a neural network, to capture patterns among text associated with the edges between respective pairs of the nodes, wherein neural network layers of the neural network are constructed such that the edges are modeled as a function of the associated text and cluster representations of the respective pairs of the nodes.

2. The method of claim 1, wherein the entities comprise a plurality of entity classes indicating patients and doctors, wherein the nodes representing the entities indicate the patients or the doctors, and wherein the edges between the nodes indicate clinical narratives composed by the doctors for the patients.

3. The method of claim 2, wherein the nodes representing the entities further indicate diagnosis and/or treatment rooms of the smart hospital, and wherein the human-interpretable entity profiles indicate an assigned room for a patient and a doctor.

4. The method of claim 2, wherein the human-interpretable entity profiles are based on first similarity scores between the patients and the doctors and second similarity scores between the patients and a plurality of rooms.

5. The method of claim 1, further comprising:
   collecting data of the system, the data comprising at least one of textual narratives about the entities, metadata about the entities, or images about the entities, and
   processing the data to prepare pre-processed data, the processing comprising at least one of text preprocessing, dictionary construction, word embedding, and image tagging, wherein obtaining the data graph comprises generating the text-labeled data graph from the pre-processed data.

6. The method of claim 5, wherein the metadata about the entities indicates demographics of a plurality of patients and textual descriptions associated with the plurality of patients.

7. The method of claim 1, further comprising constructing the neural network layers of the neural network based on the obtained data graph.

8. The method of claim 7, wherein the constructing of the neural networks layers comprises:
constructing cluster neural network layers to operate the data graph to learn cluster assignments for each of the entities, the cluster neural network layers taking as local parameters entity embedding vectors and cluster embedding vectors, the cluster embedding vectors corresponding to the cluster representations, and
constructing word neural network layers to operate the data graph to learn correlations between word embedding vectors and the edges, the word neural network layers taking as local parameters the cluster embedding vectors and the word embedding vectors.

9. The method of claim 8, further comprising performing machine learning to learn the entity embedding vectors and the cluster embedding vectors in parallel, wherein correlations are learned at cluster level and not entity level.

10. The method of claim 8,
wherein the entities are divided into at least a first entity class and a second entity class, and
wherein constructing the cluster neural network layers comprises:
constructing a first class of the cluster neural network layers for the first entity class to learn first cluster assignments of each of the entities of the first entity class, wherein, for each entity i of the first entity class, cluster weights $\theta_i$ are computed according to:

$$\theta_{j,i}=\text{normalization}(g(x_j,c_i;\xi))$$

wherein a cluster weight $\theta_{i,k}$, of the cluster weights $\theta_i$, specify a probability of that the entity i is in a cluster k of a plurality of clusters, $f$ is a neural network function that quantifies a relevance or a similarity between a corresponding entity embedding vector $x_i$, of the entity embedding vectors, and a corresponding cluster embedding vector $c_k$, of the cluster embedding vectors, $\phi$ is a parameter of the neural network function $f$, normalization is a function for normalizing the output of the neural network function, and
constructing a second class of the cluster neural network layers for the second entity class to learn second cluster assignments of each of the entities of the second entity class, wherein, for each entity j of the second entity class, cluster weights $\theta_j$ are computed according to:

$$\theta_{j,l}=\text{normalization}(g(x_j,c_l;\xi))$$

wherein a cluster weight $\theta_{j,l}$, of the cluster weights $\theta_j$, specify a probability of that the entity j is in a cluster l of a plurality of clusters, g is a neural network function that quantifies a relevance or a similarity between a corresponding entity embedding vector $x_j$, of the entity embedding vectors, and a corresponding cluster embedding vector $c_l$, of the cluster embedding vectors, $\xi$ is a parameter of the neural network function g.

11. The method of claim 1,
wherein the entities are divided into at least a first entity class and a second entity class,
wherein the nodes corresponding to the first entity class are associated with first clusters,
wherein the nodes corresponding to the second entity class are associated with second clusters,
wherein the neural network layers are configured to learn first cluster embedding vectors as the cluster representations of the first clusters,
wherein the neural network layers are configured to learn second cluster embedding vectors as the cluster representation of the first clusters,
wherein the neural network layers are configured to learn first entity embedding vectors as representations of the entities of the first entity class,
wherein the neural network layers are configured to learn second entity embedding vectors as representations of the entities of the second entity class,
wherein the tensor represents probabilistic patterns among the first clusters, the second clusters, and words of the text of the data graph, a slice of the tensor specifying a categorical word distribution for the associated text for the pair of nodes, the pair of nodes comprising a first node of a first cluster k of the first clusters and a second node of a second cluster l of the second clusters, the slice being computed according to:

$$\beta_{k,l,v}=\text{normalization}(\psi(c_k,c_l,x_v;\rho))$$

$\psi$ defines a neural network function with a parameter p, $x_v$ denotes a pre-trained word vector, $c_k$ is a first cluster embedding vector of the first cluster embedding vectors, , $c_l$ is a second cluster embedding vector of the second cluster embedding vectors, normalization is a normalization function that operates on an output of the neural network function $\psi$.

12. The method of claim 11, wherein the pre-trained word vector $x_v$ is obtained by applying Word2Vec and GloVe on the text-labeled data graph.

13. The method of claim 11, wherein the normalization function normalization is Sparsemax or Softmax.

14. The method of claim 11, the method further comprising minimizing a loss function, the loss function being:

$$-\sum_{n=1}^{N}\sum_{w=1}^{W}\log(\theta_u*\beta_{1:K,1:L,w}*\theta_v\cdot T)-$$
$$\sum_{m=1}^{M}\sum_{w'=1}^{W}\log\frac{1}{K}(\hat{1}*\beta_{1:K,1:L,w'}*\theta_{v'}\cdot T)$$

where n indexes a textual label between a first entity u, of the first entity class, and a second entity v, of the second entity class, N defines a totality of links with corresponding textual labels in the graph, m indexes a textual description of another entity v', of the second entity class, w is a word in the textual label between the first entity u and the second entity v, w' is a word in the textual description of the another entity v', $\theta_u$ is a cluster assignment of the first entity u, $\theta_v$ is a cluster assignment of the second entity v, T is a vector transpose function, $\hat{1}$ is a row vector with the value 1, and K is a number of clusters of the second entity class.

15. The method of claim 1, wherein the extracting the entity profiles from the tensor comprises:
extracting a word-based profile as the human-interpretable entity profile for each of the entities, and
extracting a vector-based profile for each of the entities.

16. The method of claim 15, wherein extracting the word-based profile comprises determining a top H number of words in the learned tensor for an associated entity of the entities as the word-based profile for the entity.

17. The method of claim 16, wherein the top H number of words are determined according to:

$$\Sigma_{w=1}^{w} = \log(\theta_u * \beta_{1:K,1:L,w} * \theta_v \cdot T)$$

wherein w is a word in the textual label of one of the edges, W is a total number of words in the textual label, $\beta_{1:K,1:L,w}$ is a slice of the tensor, $\theta_v$ is a cluster assignment of one of the entities, and T is a transpose function.

18. The method of claim 1, wherein the tensor is static.

19. A system comprising one or more processors which alone or in combination, are configured to provide for execution of a method for extracting human-interpretable entity profiles from a text-labeled data graph of a system comprised of entities, the method comprising:

obtaining a data graph associated with a smart hospital, the data graph comprising nodes representing the entities and edges between the nodes representing links between the entities, and extracting the human-interpretable entity profiles from a tensor that has been learned, using a neural network, to capture patterns among text associated with the edges between respective pairs of the nodes, wherein neural network layers of the neural network are constructed such that the edges are modeled as a function of the associated text and cluster representations of the respective pairs of the nodes.

20. A tangible, non-transitory computer-readable medium having instructions thereon which, upon being executed by one or more processors, alone or in combination, provide for execution of a method for extracting human-interpretable entity profiles from a text-labeled data graph of a system comprised of entities, the method comprising:

obtaining a data graph associated with a smart hospital, the data graph comprising nodes representing the entities and edges between the nodes representing links between the entities, and extracting the human-interpretable entity profiles from a tensor that has been learned, using a neural network, to capture patterns among text associated with the edges between respective pairs of the nodes, wherein neural network layers of the neural network are constructed such that the edges are modeled as a function of the associated text and cluster representations of the respective pairs of the nodes.

* * * * *